United States Patent [19]

Asou et al.

[11] Patent Number: 5,447,176
[45] Date of Patent: Sep. 5, 1995

[54] SPOOL TYPE CHANGE-OVER VALVE

[75] Inventors: Yoshio Asou; Bunya Hayashi; Hideharu Sato, all of Yawara, Japan

[73] Assignee: SMC Corporation, Tokyo, Japan

[21] Appl. No.: 197,284

[22] Filed: Feb. 16, 1994

[51] Int. Cl.[6] .................. F15B 13/08; F15B 13/042
[52] U.S. Cl. .................... 137/625.66; 137/596.18; 137/625.69; 137/884
[58] Field of Search .............. 137/596.18, 625.66, 137/625.69, 884

[56] References Cited

U.S. PATENT DOCUMENTS

| | | | |
|---|---|---|---|
| 3,324,885 | 6/1967 | Beech | 137/625,65 X |
| 3,902,526 | 9/1975 | Brake et al. | 137/625.66 X |
| 4,856,560 | 8/1989 | Neff et al. | 137/884 |
| 5,333,647 | 8/1994 | Fukano et al. | 137/884 |

FOREIGN PATENT DOCUMENTS 57-167571 10/1982 Japan ..................... 137/625.69

Primary Examiner—Gerald A. Michalsky
Attorney, Agent, or Firm—Oblon, Spivak, McClelland, Maier & Neustadt

[57] ABSTRACT

In a pilot-driven spool type change-over valve, a lateral width of a valve body and sizes of each port and valve hole are efficiently determined in such a manner that flow rate or fluid per unit time reaches the highest value without substantially impairing responsiveness in order to increase ability to change over the fluid. An inner diameter of the valve hole a lateral length of an opening of the port are set to substantially the highest value as determined by lateral width of the valve body, and longitudinal diameter a of an opening of each port, i.e. length in axial direction in the valve hole, is set to such a size that a characteristic value given by $a/W^2$ is 1.5 to $2.2 \times 10^{-2}$.

4 Claims, 2 Drawing Sheets

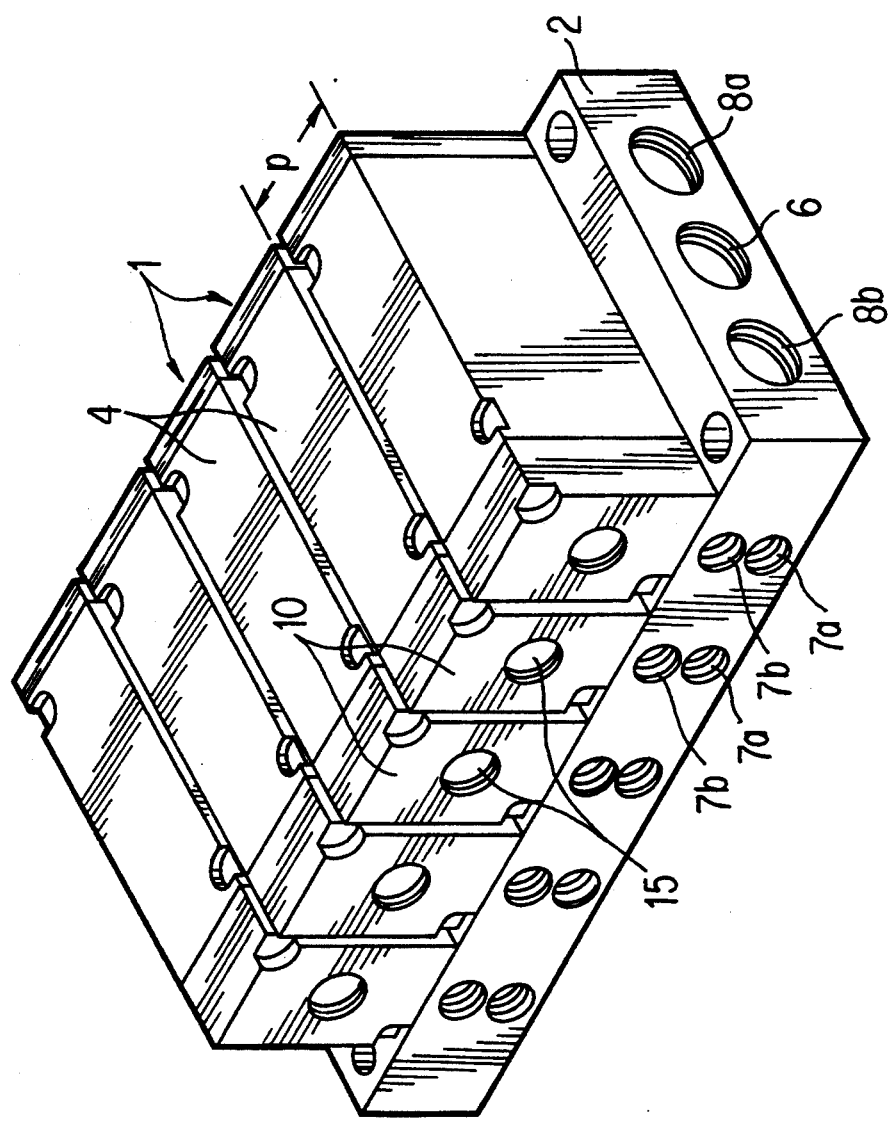

SPOOL TYPE CHANGE-OVER VALVE

FIELD OF THE INVENTION

The present invention relates to a pilot-driven spool type change-over valve efficiently designed in compact form so that a fluid with a high flow rate can be changed over, and in particular to a pilot-driven spool type change-over valve, which is placed in parallel on a manifold base and which can improve flow rate and responsiveness without increasing lateral width of a valve body.

DESCRIPTION OF PRIOR ART

In the past, a pilot-driven spool type change-over valve is known as a change-over valve to be placed in parallel on a manifold base. In general, such a change-over valve comprises a valve body having a plurality of ports to pass pressure fluid and a valve hole communicating with these ports, a spool of oblong rectangular parallelopiped form provided slidably in an axial direction within the valve hole, and a flowing direction of the fluid between the plurality of ports can be changed over by sliding the spool in the axial direction by means of pilot fluid pressure.

The important performance characteristics required for such a pilot-driven spool type change-over valve are high flow rate of the fluid per unit time and quick responsiveness. Further, in a manifold type change-over valve assembly where a plurality of spool-type change-over valves are placed in parallel on a manifold base for manifold piping, it is necessary to reduce a mounting pitch "p" of each spool type change-over valve with respect to flow rate while giving full consideration on flow rate. i.e. it is necessary to reduce a lateral width of the spool type change-over valve.

When the manifold type change-over valve is installed, output pipes and electrical wirings are provided in the direction of valve hole of the valve body, and there is usually provided a surplus space for installation in this direction. For this reason, it is necessary to reduce the lateral width of the spool type change-over valve as described above even when the spool type change-over valve may become somewhat longer in the direction of the valve hole.

However, there are restrictions on a diameter of an opening of each port on the above spool type change-over valve and also a diameter of the valve hole where the spool is accommodated because of the limitation of lateral width of the valve body. If it is tried to narrow down the lateral width of the valve body in order to reduce the mounting pitch "p", the diameter or the opening of each port and the diameter of valve hole have to be necessarily decreased. This leads to the reduction of flow rate of the fluid per unit time.

As a result, the flow rate is not decreased even when lateral width of the valve body is reduced, or if there is no change in lateral width of the valve body, it is necessary to have an ability to change over the fluid with a higher flow rate in order that the spool type change-over valve can be designed in a compact form. In this case, however, elongating the valve body in the direction of the valve hole and increasing a stroke of the spool mean that the responsiveness is decreased. Thus, care must be taken not to impair the responsiveness.

SUMMARY OF THE INVENTION

It is an object of the present invention to provide a spool type change-over valve with compact design, by which it is possible not to reduce flow rate even when a lateral width of the valve body is narrowed down in a pilot-driven spool type change-over valve, and to provide an ability to change over a fluid with higher flow rate without changing the lateral width of the valve body.

It is another object of the present invention to achieve compact design of the above-mentioned spool type change-over valve so that responsiveness of the pilot-driven spool type change-over valve is not impaired even when the valve body is somewhat elongated in a direction of the valve hole.

It is still another object of the present invention to provide a pilot-driven spool type change-over valve, which has an excellent ability to change over fluid by setting an efficient dimension so that flow rate of the fluid per unit time is at the highest.

To attain the above objects, the spool-type change-over valve according to the present invention comprises a valve body having a plurality of ports to pass pressure fluid and a valve hole communicated with these ports, a spool provided slidably in an axial direction within the valve hole, and a piston to drive the spool by a pilot fluid, and a flowing direction of the fluid between the plurality of ports can be changed over by sliding the spool in the axial direction by means of a piston. Further, an opening of each of the ports is formed in a rectangular shape, an inner diameter of the valve hole and lateral length of opening, i.e. length in an inward direction of each port in the valve hole, are set to the highest value to be determined by lateral width W of the valve body, and longitudinal length "a" of the opening, i.e. a length of each port in the axial direction of the valve hole is set to such a size that a characteristic value given by $a/W^2$ is $1.4$ to $2.5 \times 10^{-2}$, or more preferably, $1.5$ to $2.2 \times 10^{-2}$.

When a plurality of the spool type change-over valves of the present invention are installed in parallel on a manifold base for manifold piping, an assembly of manifold type change-over valves is provided.

BRIEF DESCRIPTION OF THE DRAWINGS

FIG. 3 is a perspective view of a manifold type change-over valve assembly where a plurality of spool type change-over valves are mounted on a manifold base.

DETAILED DESCRIPTION OF THE PREFERRED EMBODIMENTS

Figure 1:
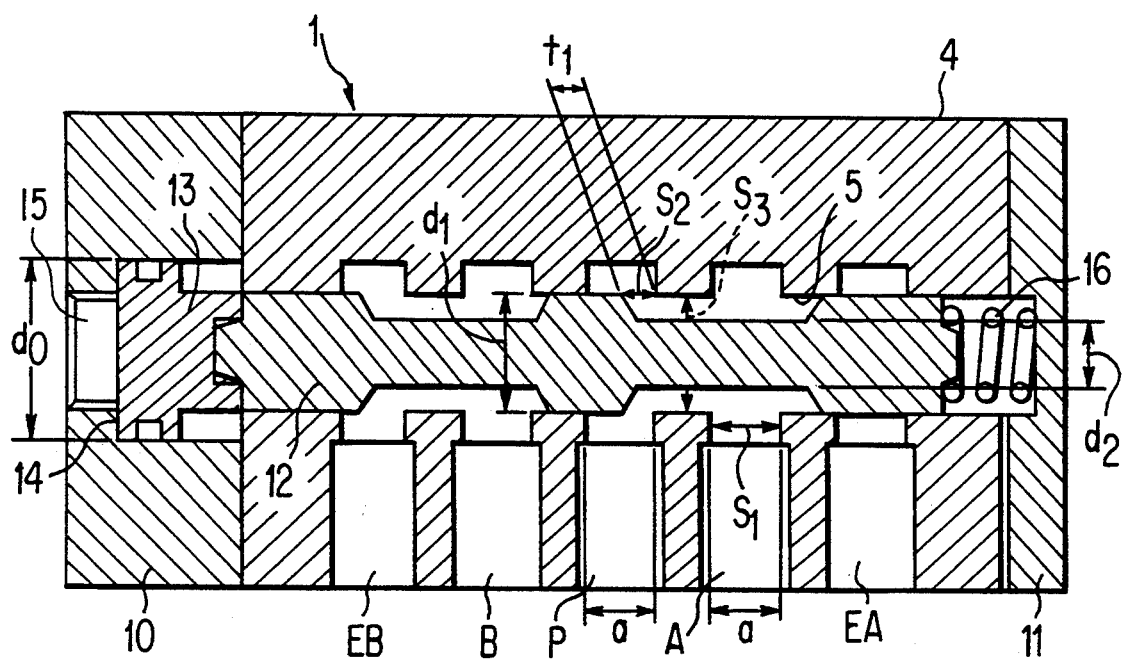
FIG. 1 is a cross-sectional view of an embodiment of a spool type change-over valve of the present invention.
Figure 2:
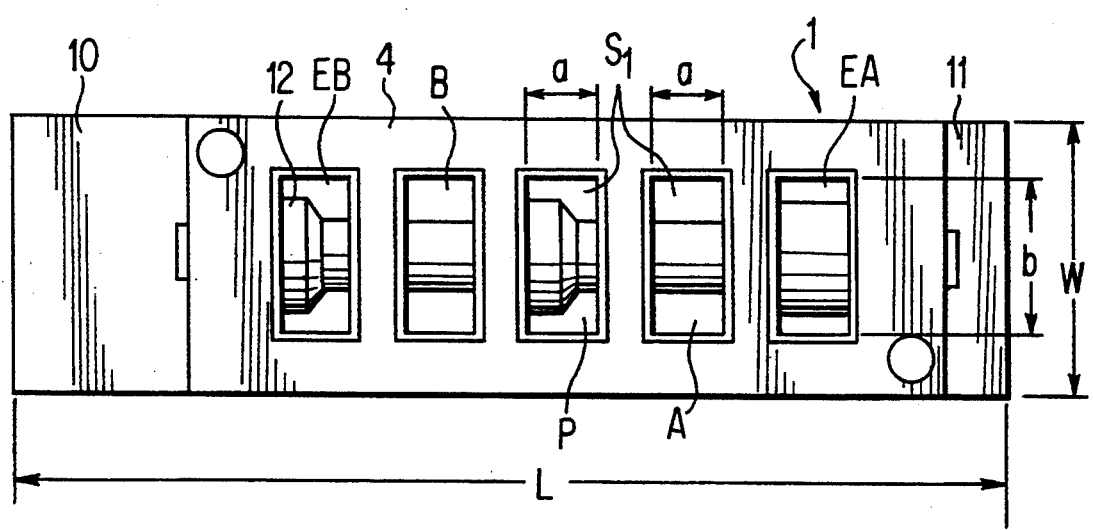
FIG. 2 is a bottom view of the embodiment of FIG. 1.

FIG. 1 and FIG. 2 each represents an embodiment of a pilot-driven spool type change-over valve of the present invention. A valve body 4 in a form of an oblong rectangular parallelopiped of the change-over valve comprises a central inlet port P where pressure fluid such as compressed air flows, outlet ports A and B on both sides, and discharge ports EA and EB on both sides, and there is a valve hole 5 communicating with each of these ports in longitudinal direction, and a spool 12 is provided slidably in axial direction within said valve hole 5. Each of said ports has rectangular shape so that shape of an opening (cross-sectional shape of flow passage) has maximum opening area, and these ports are arranged in a line in axial direction of the valve hole 5. By sliding the spool 12 in axial direction, the input port p is changed over to either output ports A or B at left or right, and the other output port not communicated with the input P is changed over to an adjacent discharge port.

On each end of the valve body 4 in longitudinal direction, end plates 10 and 11 are mounted respectively. The end plate 10 comprises a piston chamber 14 with a built-in piston 13 slidably provided in the axial direction of the spool 12, and a pilot port 15 for supplying and discharging pilot fluid to and from the piston chamber 14. Between the other end plate 11 and the spool 12, a return spring 16 for turning the spool 12 back is provided in a compressed state, and when the pilot fluid is supplied or discharged to and from the piston chamber 14, the spool 12 is reciprocally driven via the piston 13.

A plurality of the spool type change-over valves with the above arrangement are mounted on a manifold base 2 for manifold piping as shown in FIG. 3, and a manifold type change-over valve assembly is provided. In this case, an inlet port P, outlet ports A and B, and discharge ports EA and EB of each change-over valve 1 communicate with an input hole 6, output holes 7a and 7b, and discharge holes 8a and 8b respectively. The input hole 6 is connected to an air pressure source, and output holes 7a and 7b are connected to an air pressure driving device to be driven. The discharge holes 8a and 8b are connected to exhaust pipes for collective discharge.

In order to design such a manifold type change-over valve assembly as described above in an arrangement direction of the change-over valves, it is necessary to reduce mounting pitch "p" of each change-over valve 1, and a lateral width of each change-over valve 1 must be reduced accordingly. However, when the lateral width of the change-over valve 1 is reduced, a diameter of an opening of each port and an inner diameter of the valve hole 5 are decreased, and this decreases flow rate of the fluid per unit time. In this case, however, if the valve body is elongated in the direction of the valve hole to increase the diameter of an opening of the port, stroke of the spool is increased, and this leads to the reduction of responsiveness. Thus, care must be taken not to impair the responsiveness.

In this respect, in order that high flow rate of the fluid can be maintained even when the dimension of the width of the valve body 4 in the spool type change-over valve 1 and sizes of each port and of valve hole 5 are efficiently set in such a manner that flow rate of the fluid per unit time reaches the highest value without impairing responsiveness of the change-over valve.

In the following, a more concrete description will be given.

In the above spool type change-over valve 1, when a lateral width W of the valve body 4 is determined, the maximum lateral diameter $b_{max}$ (length in inward direction in valve hole), a maximum diameter $d_0 max$ of the piston 13, i.e. approximately equal to maximum diameter of the flow passage in the valve hole, and a maximum diameter of the spool 12 $d_1 max$ are necessarily determined as these are proportional to the lateral width W. The minimum diameter $d_2 min$ of the portion with the smallest diameter of the spool 12, which forms a passage in the axial direction within the valve hole, is determined according to mechanical strength of the spool 12.

If it is supposed that an opening area (cross-sectional area of passage) of each port is equal to each other, and that the cross-sectional area is $S_1$, and longitudinal length of the port (length in axial direction in the valve hole) is a, there exists the relationship:

$$S_1 = a \times b$$

$$S_1 = a \times b$$

and the maximum value of lateral length b of the port is determined by the lateral width W of the valve body 4, while longitudinal length a can be changed regardless of the lateral width W of the valve body 4.

If it is supposed that opening stroke of the spool 12 is $t_1$, an opening area $S_2$ of an opening in a circumferential direction, which communicates the port with the valve hole 5 when restrictively opened by the spool 12, is given by:

$$S_2 = \pi d_1 \times t_1.$$

In the above, the maximum value of the diameter $d_1$ of the spool 12 is determined by the lateral width W of the valve body 4, while opening stroke $t_1$ of the spool 12 can be changed regardless of the lateral width W of the valve body 4.

Further, cross-sectional area $S_3$ of an axial flow passage surrounding the portion with small diameter of the spool 12 in the valve hole 5 is given by:

$$S_3 = \pi(d_1^2 - d_2^2)/4$$

and this is primarily determined by lateral width W of the valve body 4 and mechanical strength of the spool 12.

Here, the flow rate per unit time, which is a function required for the spool type change-over valve 1, can be expressed by effective area $S_0$. For example, effective cross-sectional area $S_0$ of the entire passage in case the fluid flows from the inlet port P toward the outlet ports A or B is given as a synthesis value of an opening area $S_1$ of the port P and the ports A or B, an opening area $S_2$ of an opening in the circumferential direction communicating the port with the valve hole 5, and cross-sectional area $S_3$ of flow passage in axial direction of the valve hole 5. That is, $$\frac{1}{S_0^2} = \frac{1}{S_1^2} + \frac{1}{S_2^2} + \frac{1}{S_3^2} + \frac{1}{S_1^2} \qquad (1)$$

$$= \frac{2}{S_1^2} + \frac{1}{S_2^2} + \frac{1}{S_3^2}$$

On the other hand, the relationship between driving force of the piston 13 and reactive force of the return spring 16 can be adequately determined as 1:1, for example. When the ratio of force relationship is constant, volume $V_0$ of the piston chamber 14 exerts an influence on response time, and the volume $V_0$ can be given by:

$$V_0 = (\pi/4)d_0^2 \times t_0$$

if it is supposed that the stroke of the piston 13 is $t_0$. The response time $T_0$ of the spool type change-over valve 1 can be given by:

$$T_0 = K_1 \cdot V_0 \text{ (where } K_1 \text{ is a coefficient)} \quad (2)$$

Here, the flow rate per unit time, which is a function required for the spool type change-over valve 1, is proportional to the above-mentioned effective cross-sectional area $S_0$, and the response time $T_0$ of the spool type change-over valve must be short. Thus, by taking this into account, the measure $\eta$ for efficient designing is given by:

$$\eta = \frac{S_0}{T_0} \quad (3)$$

However, it is not possible to equally evaluate the effective cross-sectional area $S_0$ and the response time $T_0$. If weights of these values are added, it is generally given by:

$$\eta = \frac{S_0^n}{T_0^m} \quad (4)$$

For the calculation of the above equations (3) or (4), it is assumed that b and d1 are proportional to W, and the above equation (1) is calculated. Since:

$$S_1 = a \cdot b = k_1 \cdot a \cdot W \text{ (}k_1 \text{ is a constant)}$$

$$S_2 = \pi \cdot d_1 \cdot t_1 = k_2 \cdot W \cdot t_1 \text{ (}k_2 \text{ is a constant)}$$

$$S_3 = \pi \cdot (d_1^2 - d_2^2)/4 = k_3 \cdot W^2 \text{ (}k_3 \text{ is a constant)},$$

by substituting these into the equation (1), $$\frac{1}{S_0^2} = \left[ \frac{2}{k_1^2 \cdot a^2} + \frac{1}{k_2^2 \cdot t_1^2} + \frac{1}{k_3^2 \cdot W^2} \right] \cdot \frac{1}{W^2} \quad (5)$$

Here, $S_2$ is changeable according to length $t_1$ of the opening in the axial direction by rand of the spool 12, and the length $t_1$ is also influenced by the stroke $t_0$ of the piston 13 (opening stroke of the spool), but it is a value, which can be set relatively arbitrarily according to the other factors, and $S_2$ is thus negligible. $S_3$ is influenced by $d_2$, which is relatively irrelevant to a size of the valve body, and it has relatively less possibility to influence the longitudinal length a of the port. Thus, by neglecting these to simplify the calculation, $S_0$ can be for $S_1$ alone as follows:

$$S_0 = k_0 \cdot a \cdot W \quad (6)$$

The stroke $t_0$ of the piston 13 is changed in proportion to longitudinal length a of each port, and diameter $d_0$ of the piston can be regarded as proportional to W. Thus, the response time $T_0$ given by the equation (2Z) can be expressed as:

$$T_0 = K_1 \cdot V_0 = K_1 \cdot (\pi/4) d_0^2 \times t_0 \quad (7)$$
$$= K_2 \cdot a \cdot W^2 \text{ (}k_2 \text{ is a constant)}$$

Thus, the equation (4) can be calculated by these values, while there are the problems of how the weight of each of the effective cross-sectional area $S_0$ and the response time $T_0$ should be added and how m and n should be set.

In this respect, the present inventor took note of the longitudinal length a of the port and the lateral width W of the valve body 4, and experiments and calculations were carried out. As a result, it was found that the value of $a/W^2$ is effective as a characteristic value to evaluate performance characteristics of the spool type change-over valve and that the spool type change-over valve gives the desired performance characteristics when the above value is within the range of 1.4 to $2.5 \times 10^{-2}$, or more preferably, 1.5 to $2.2 \times 10^{-2}$. If the above assumption and simplified calculation do not cause substantial error, this corresponds to the case where m=3 and n=4.

It has been confirmed that performance characteristics of the spool type change-over valve are by two times or more higher according to the measurement of the flow rate as described below, and that the desired value of the response time of at least 20 ms, or more preferably 10 ms, can be attained.

This is given by:

$$\eta = \frac{S_0^n}{T_0^m} = F(a/W^2), \quad (8)$$

where F is a symbol for function. This means that $\eta$ takes a value higher than a certain value when the value of $(a/W^2) \times 100$ is within the range of 1.4 to 2.5. Because it is difficult to measure the value of $\eta$ itself, this value has not been numerically determined. By trial products with valve component parts having different dimensions, the results given below could be obtained. In the tables below, when the flow rate reaches approximately two times or more compared with a conventional case having the same value of W, the case is marked as ○. The case where response time is 20 ms or less is marked as ○ in the valuation of the responsiveness, and the other cases are given by X.

| No. | W | a | $\frac{a}{W^2} \times 100$ | Evaluation of flow rate | Evaluation of responsiveness |
|---|---|---|---|---|---|
| Products according to the present invention ||||||
| 1 | 10 | 1.9 | 1.90 | ○ | ○ |
| 2 | 15 | 3.4 | 1.50 | ○ | ○ |
| 3 | 18 | 5.0 | 1.54 | ○ | ○ |
| 4 (comparative example) | 10 | 2.6 | 2.60 | ○ | X |
| Conventional products ||||||
| 1 | 10 | 1.2 | 1.20 | | |
| 2 | 15 | 2.4 | 1.07 | | |
| 3 | 18 | 3.3 | 1.02 | | |
| 4 | 23 | 3.8 | 0.74 | | |
| 5 | 32 | 9.5 | 0.93 | | |

What we claim are:
1. A spool type change-over valve, comprising:
a valve body with an oblong rectangular parallelopiped form having a plurality of ports where pressure fluid flows, the valve body having a dimension W defining a lateral width of the valve body;
a valve hole communicating with the plurality of ports;
a spool provided slidably in an axial direction within said valve hole; and
a piston for driving said spool by a pilot fluid, whereby a flowing direction of the fluid between said plurality of ports is changed over by sliding said spool in the axial direction by means of the piston;

wherein a shape of an opening of each of said plurality of ports is designed in a rectangular form; and wherein a longitudinal length a of the opening of each port, representing a length in the axial direction in the valve hole, is set to such a size that a characteristic value given by $a/W^2$ is 1.4 to $2.5 \times 10^{-2}$.

2. The spool type change-over valve according to claim 1, wherein the longitudinal length a of the opening of each port is set to such a size that the characteristic value given by $a/W^2$ is 1.5 to $2.2 \times 10^{-2}$.

3. A manifold change-over valve assembly, comprising:

a manifold base;

a plurality of spool type change-over valves mounted on the manifold base, each of the plurality of spool change-over valves comprising:

a valve body with an oblong rectangular parallelepiped form having a plurality of ports where pressure fluid flows, the valve body having a dimension W defining a lateral width of the valve body;

a valve hole communicating with the plurality of ports;

a spool provided slidably in an axial direction within said valve holes; and a piston for driving said spool by a pilot fluid, whereby a flowing direction of the fluid between said plurality of ports is changed over by sliding said spool in the axial direction by means of the piston;

wherein a shape of an opening of each of said plurality of ports is designed in a rectangular form; and wherein a longitudinal length a of the opening of each port, representing a length in the axial direction in the valve hole, is set to such a size that a characteristic value given by $a/W^2$ is 1.4 to $2.5 \times 10^{-2}$.

4. The spool type change-over valve according to claim 3, wherein the longitudinal length a of the opening of each port is set to such a size that the characteristic value given by $a/W^2$ is 1.5 to $2.2 \times 10^{-2}$.

* * * * *

UNITED STATES PATENT AND TRADEMARK OFFICE
CERTIFICATE OF CORRECTION

PATENT NO.   : 5,447,176
DATED        : September 5, 1995
INVENTOR(S)  : Yoshio Asou, et al.

It is certified that error appears in the above-identified patent and that said Letters Patent is hereby corrected as shown below:

Column 7,
Line 8, change "1.4 to 2.5x $10^{312}$" to --1.4 to 2.5 x $10^{-2}$--.
Line 12, change "1.5 to 2.2x $10^{312}$" to --1.5 to 2.2 x $10^{-2}$ --.

Signed and Sealed this

Tenth Day of July, 2001

*Attest:*

*Nicholas P. Godici*

*Attesting Officer*

NICHOLAS P. GODICI
*Acting Director of the United States Patent and Trademark Office*